United States Patent
Herzinger et al.

(10) Patent No.: US 10,061,068 B1
(45) Date of Patent: Aug. 28, 2018

(54) DEVIATION ANGLE SELF-COMPENSATING SUBSTANTIALLY ACHROMATIC RETARDER

(71) Applicant: J.A. WOOLLAM CO., INC., Lincoln, NE (US)

(72) Inventors: Craig M. Herzinger, Lincoln, NE (US); Ping He, Lincoln, NE (US); Jeffrey S. Hale, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

(21) Appl. No.: 15/530,779

(22) Filed: Feb. 27, 2017

Related U.S. Application Data

(60) Provisional application No. 62/389,551, filed on Mar. 3, 2016.

(51) Int. Cl.
*G02B 5/30* (2006.01)
*G02B 7/00* (2006.01)
*G02B 17/00* (2006.01)

(52) U.S. Cl.
CPC ........... *G02B 5/3083* (2013.01); *G02B 7/003* (2013.01); *G02B 17/006* (2013.01)

(58) Field of Classification Search
CPC .... G02B 5/3083; G02B 7/003; G02B 17/006; G01B 9/02; G01J 3/45; G01J 4/00
USPC ........... 359/489.07; 356/369, 450, 451, 497, 356/498, 503, 504
See application file for complete search history.

(56) References Cited

U.S. PATENT DOCUMENTS

| | | | | |
|---|---|---|---|---|
| 3,439,968 A | * | 4/1969 | Horton | G02B 5/3066 359/352 |
| 4,778,263 A | * | 10/1988 | Foltyn | G02B 5/285 359/580 |
| 5,251,058 A | * | 10/1993 | MacArthur | H04N 1/036 347/239 |
| 5,757,494 A | * | 5/1998 | Green | C23C 14/54 250/225 |
| 5,946,098 A | * | 8/1999 | Johs | G01J 4/00 356/364 |
| 5,956,145 A | * | 9/1999 | Green | G01J 4/00 356/364 |
| 6,100,981 A | * | 8/2000 | Johs | G01J 4/00 356/364 |
| 6,118,537 A | * | 9/2000 | Johs | G02B 5/3083 356/364 |
| 6,353,477 B1 | * | 3/2002 | Johs | G01J 3/447 356/369 |
| 6,456,376 B1 | * | 9/2002 | Liphardt | G01J 3/447 356/369 |

(Continued)

*Primary Examiner* — Frank Font
(74) *Attorney, Agent, or Firm* — James D. Welch

(57) ABSTRACT

A substantially achromatic multiple element compensator system for use in a wide spectral range, (for example 190-1700 nm), rotating compensator spectroscopic ellipsometer or polarimeter or the like system, which does not require external surface coatings at locations whereat total internal reflections occur. Multiple total internal reflections enter retardance into an entered beam of electromagnetic radiation. Berek-type retarders on both input and output sides of the multiple elements are oriented to minimize changes in the net retardance vs. wavelength via adjustment of Berek-type retarders. Berek-type retarders.

17 Claims, 2 Drawing Sheets

(56) References Cited

U.S. PATENT DOCUMENTS

| | | | | |
|---|---|---|---|---|
| 6,483,586 B1* | 11/2002 | Johs | ........................ | G01J 3/447 |
| | | | | 356/369 |
| 6,822,738 B1* | 11/2004 | Johs | ........................ | G01J 3/447 |
| | | | | 356/369 |
| 6,982,792 B1* | 1/2006 | Woollam | ................... | G01J 3/02 |
| | | | | 356/369 |
| 7,075,649 B1* | 7/2006 | Johs | ..................... | G01N 21/211 |
| | | | | 356/369 |
| 7,099,006 B1* | 8/2006 | Johs | ..................... | G01N 21/211 |
| | | | | 356/369 |
| 7,158,231 B1* | 1/2007 | Woollam | ................... | G01J 3/02 |
| | | | | 356/369 |
| 7,245,376 B2* | 7/2007 | Liphardt | ................... | G01J 3/02 |
| | | | | 356/369 |
| 7,304,737 B1* | 12/2007 | Liphardt | .............. | G01N 21/211 |
| | | | | 356/369 |
| 7,336,361 B1* | 2/2008 | Liphardt | ................... | G01J 4/00 |
| | | | | 356/369 |
| 7,460,230 B2* | 12/2008 | Johs | ..................... | G02B 27/286 |
| | | | | 356/365 |
| 7,616,319 B1* | 11/2009 | Woollam | ................... | G01J 3/02 |
| | | | | 356/369 |
| 7,633,625 B1* | 12/2009 | Woollam | ................... | G01J 3/02 |
| | | | | 356/369 |
| 8,462,341 B2* | 6/2013 | He | ............................ | G01J 4/04 |
| | | | | 356/365 |
| 9,921,352 B1* | 3/2018 | Herzinger | ............ | H05K 999/99 |
| 2006/0268272 A1* | 11/2006 | Liphardt | ................... | G01J 3/02 |
| | | | | 356/369 |
| 2010/0245819 A1* | 9/2010 | Li | ..................... | G01B 11/0641 |
| | | | | 356/327 |

* cited by examiner

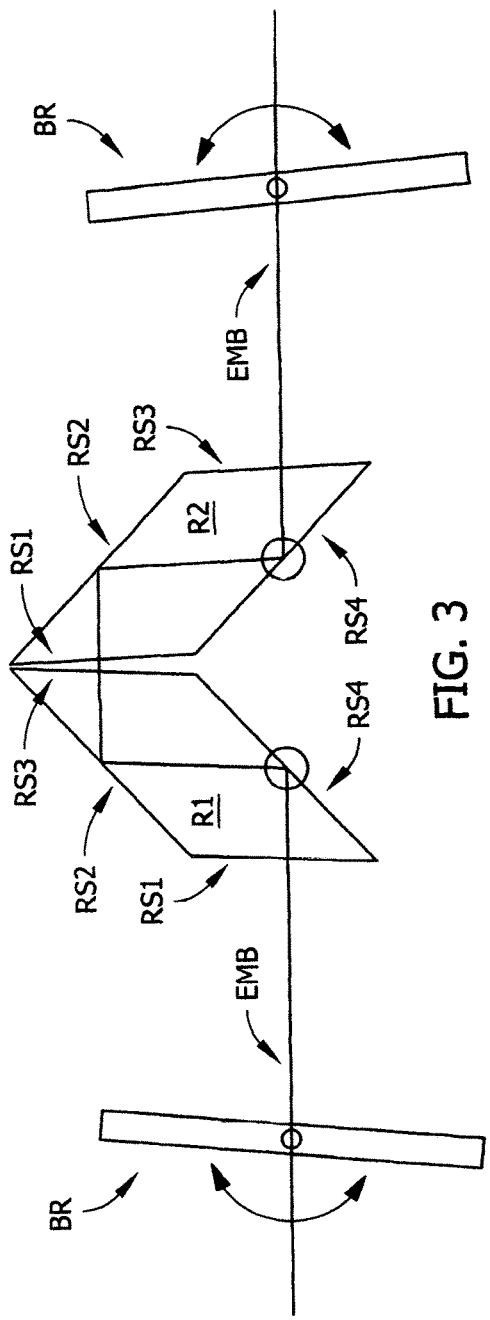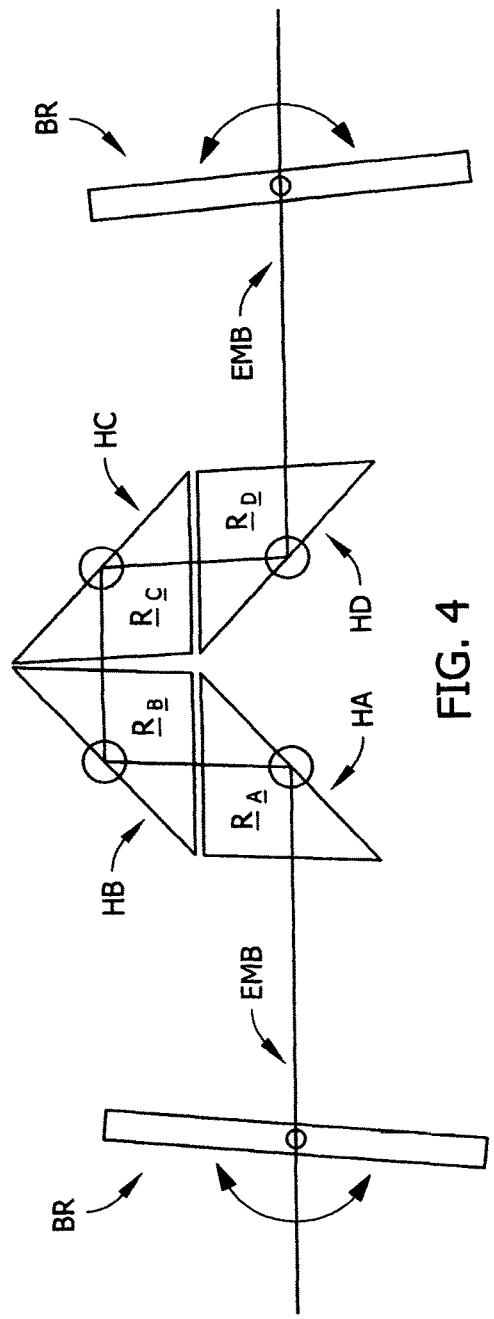

DEVIATION ANGLE SELF-COMPENSATING SUBSTANTIALLY ACHROMATIC RETARDER

This Application Claims Benefit from Provisional Application Ser. No. 62/389,551 Filed Mar. 3, 2016.

TECHNICAL FIELD

The present invention relates to retarders that enter a phase angle between orthogonal components in a beam of polarized electromagnetic radiation, and more particularly to substantially achromatic multiple element compensator system suitable for use over a wide spectral range, (for example 190-1700 nm), in rotating compensator spectroscopic ellipsometer or polarimeter or the like systems. Multiple total internal reflections enter retardance into an entered beam of electromagnetic radiation in a way that minimizes offset and deviation differences in input beam and output beam resulting from changes in the position and/or rotation, (about the locus of a beam), of the compensator system elements. No external surface coating are required at external surface locations of system elements whereat total internal reflection occurs. Instead, Berek-type retarders on both input and output are present and oriented to minimize changes in the net retardance vs. wavelength, without the need for such coatings.

BACKGROUND

In 2008 a U.S. Pat. No. 7,450,231 to Johs et al. issued that described a substantially achromatic Retarder. In March 2011 a U.S. Pat. No. 7,907,280 issued to a method of manufacturing said retarder issued, and in June of 2013 a Patent for a mounting for said retarder, U.S. Pat. No. 8,462,341 to He et al. issued. Said 231, 280 and 341 Patents are entered by reference herein. Additional Patents to said retarder etc. have issued in foreign forums as well.

The retarder previously taught in the identified Patents provided that four total internal reflection occur, each of which entered some retardance into a beam of electromagnetic radiation. To improve the achromaticity of the entered retardance, the surfaces of the retarder elements at locations thereof at which total internal reflectance occurred, were coated with $MgF_2$. It has been found, however, that while this coating of $MgF_2$ on the appropriate surfaces improved achromaticity, it also causes reduction in beam intensity. This is a major concern in some applications where insufficient beam intensity can cause degradation of the ability to investigate samples. Also provided was a dual wedge arrangement following the retarder element per se., that facilitated correcting for beam deviation and displacement.

A need remains for a substantially achromatic retarder system that provides substantially achromatic entry of phase retardation between orthogonal components of a polarized electromagnetic beam, over a specified wavelength range, without significantly and adversely affecting the intensity of said beam.

BRIEF SUMMARY OF THE INVENTION

The present invention is basically a similar arrangement of phase retardation entering elements, as previously taught and described in the Background Section, but without $MgF_2$ coatings on the surfaces of the retarder elements, at locations thereof at which total internal reflectance occurs. Instead of using $MgF_2$ coatings, Berek-type retarder plates are placed before and after the arrangement of achromatic retarder elements in which four total internal reflections occur, and the tips of said Berek-type retarders are adjusted to provide substantial achromaticity over a specified range of wavelengths.

A present invention system for introducing a relative phase retardation into orthogonal polarized components of an electromagnetic beam entered thereinto, comprises at least two sequential elements oriented with respect to one another such that said entered electromagnetic beam undergoes total internal reflection at least twice in each of the at least two elements. The sequence, orientation, geometry, and symmetry of the elements is such that the locus of an output beam of electromagnetic radiation is substantially undeviated and untranslated by a translation of the system, or by a rotation of the system about a locus of a beam of electromagnetic radiation input thereto. Further note, the output beam is continuous with the input beam.

(Note, "translation" indicates a beam exits parallel to, but at a position offset from the input beam, and "deviation" indicates a beam exits at an angle to the locus of the beam input thereto).

Significantly, said present invention system does not require any, intensity reducing, external surface coatings at locations on the at least two sequential elements whereat total internal reflection occurs.

The present invention system is distinguished and characterized by the presence of first and second Berek-type retarders at the input and at the output of, respectively, the at least two sequential elements. In use, a beam of polarized electromagnetic radiation passes through the first Berek-type retarder, undergoes two total internal reflections in the first sequential element, two total internal reflections in the second sequential element, and exits through said second Berek-type retarder, said existing polarized beam having entered thereinto a phase retardation between orthogonal components thereof which is substantially uniform over a specified range of wavelengths, (eg. 190-1700 nm). Said system requires no external surface coating at locations thereof whereat total internal reflection occurs, and in the preferred embodiment no such coating is present. This is a significant distinguishing factor as compared to disclosed known prior art. Said system can then be characterized by one selection from the group consisting of:
 there is an external coating at at least one location at which total internal reflection occurs; and
 there is no external coating at at least one location at which total internal reflection occurs.

(Note, a Berek-type Retarder has it's optical Axis perpendicular to the surface thereof an elecetromagnetic beam is entered).

The present invention is then a system for introducing a relative phase retardation between orthogonal components of a polarized electromagnetic beam entered thereinto, said system consisting of at least two sequential elements oriented with respect to one another such that said entered electromagnetic beam undergoes total internal reflection at least twice in each of the at least two elements; the sequence, orientation, geometry, and symmetry of the elements being such that the output beam position is substantially undeviated or translated by a translation of the system, or by a rotation of the system about the locus of said beam input beam.

For emphasis, said system does not require any external surface coating at locations thereof whereat total internal reflection occurs therewithin, and therefore avoids beam intensity reduction effects associated with such coatings.

Said at least two element system is, instead, distinguished and characterized by the additional presence of first and second Berek-type retarders at the input and at the output thereof, respectively, so that in use a polarized beam of electromagnetic radiation passes through the first Berek-type retarder, undergoes two total internal reflections in the first sequential element, two total internal reflections in the second sequential element, and exits through said second Berek-type retarder. Again, the presence of Berek-type retarders as described, instead of coatings on the at least two elements at locations where a beam totally reflects in use, avoids beam intensity reduction, while enabling a significantly uniform achromatic phase retardation over a desired range of wavelengths.

It is also noted that a present invention system can comprise at least four sequential elements, and said beam undergoing total internal reflection once in each of the elements, said system being characterized in that each of said at least four elements are right angle prisms having right angle sides adjacent to the right angle thereof and a side opposite the right angle thereof, aid right angle prisms being oriented with respect to one another such that, as viewed in side elevation, the first right angle is positioned so that it's side opposite the right angle thereof is facing downward and to the right, and so that directly above the first right angle prism is present a second right angle prism, which is oriented so that its opposite the right angle thereof is facing upward and to the left, and so that directly to the right of the second right angle prism is a third right angle prism, which is oriented so that it's side opposite the right angle thereof is facing upward and to the right, and so that directly below said third right angle prism is positioned a fourth right angle prism, oriented so that it's side opposite the right angle thereof is facing downward and to the left. It is to be appreciated that said first two right angle prisms encountered by said beam form, in functional combination, the first of said at least two sequential elements and wherein the reflections in said first two right angle prisms constitute the at least two reflections in said first of said at least two sequential elements, and the second two of said right angle prisms encountered by said beam form, in functional combination, the second of said at least two sequential elements, and wherein the reflections in said second two right angle prisms constitute the at least two reflections in said second of said at least two sequential elements.

Said system can provide that the angle of the right angle prisms are 45, 90 and 45 degrees.

Said system can provide that the right angle prisms are fabricated from fused silica.

Said system can further comprises means for translating and/or tilting at least one of the at least two sequential elements for the purpose of aligning the system such that a locus of the output beam of electromagnetic radiation is substantially undeviated and untranslated from a locus of said input beam of electromagnetic radiation.

While not required in the present invention, as described in prior art, there could be additionally present a multiple wedge system for use in adjusting relative phase retardation between orthogonal components in a polarized electromagnetic beam, and wherein one said wedge can be rotated with respect to another thereof, and/or both wedges can be rotated simultaneously, for the purpose of aligning the system so that the output beam is substantially undeviated for said input beam.

A present invention method of applying a system for introducing a relative phase retardation between orthogonal polarized components of a polarized beam of electromagnetic radiation entered thereinto comprises;

a) providing a system consisting of at least two sequential elements oriented with respect to one another such that an entered polarized beam of electromagnetic radiation undergoes total internal reflection at least twice in each of the at least two sequential elements; the sequence, orientation, geometry, and symmetry of the at least two sequential elements being such that the locus of an output beam of electromagnetic radiation is substantially undeviated and untranslated from a locus of the input beam of electromagnetic radiation by a translation of the system, or by a rotation of the system about the locus of said input beam of electromagnetic radiation;

a) providing a system consisting of at least two sequential elements oriented with respect to one another such that an entered beam of electromagnetic radiation undergoes total internal reflection at least twice in each of the at least two sequential elements; the sequence, orientation, geometry, and symmetry of the at least two sequential-elements being such that the locus of the output beam of electromagnetic radiation is substantially undeviated and untranslated by a translation of the system, or by a rotation of the system about the locus of said input beam of electromagnetic radiation;
said system being characterized by one selection from the group consisting of:
    there is an external coating at at least one location at which total internal reflection occurs; and
    there is no external coating at at least one location at which total internal reflection occurs.

Said system is distinguished and characterized by the further presence of first and second Berek-type retarders at the input thereof and at the output therefrom, respectively, so that in use a polarized beam of electromagnetic radiation passes through the first Berek-type retarder, undergoes two total internal reflections in the first sequential element, two total internal reflections in the second sequential element, and then exits through said second Berek-type retarder;
said method further comprising:

b) causing a polarized input beam of electromagnetic radiation to enter the first Berek-type retarder, then pass through the first and second sequential elements, and then pass through the second Berek-type retarder;

c) effecting tilt of said first and second Berek-type retarders so that substantially achromatic retardation is entered between orthogonal components of said beam of polarized electromagnetic radiation over a selected wavelength range.

The present invention will be better understood by reference to the Detailed Description of this Specification, in conjunction with the Drawings.

BRIEF DESCRIPTION OF THE DRAWINGS

FIGS. 3 and 4 show a present invention system of substantially achromatic retarders, including Berek-type retarders at the input and output thereof.

DETAILED DESCRIPTION

Figure 1:
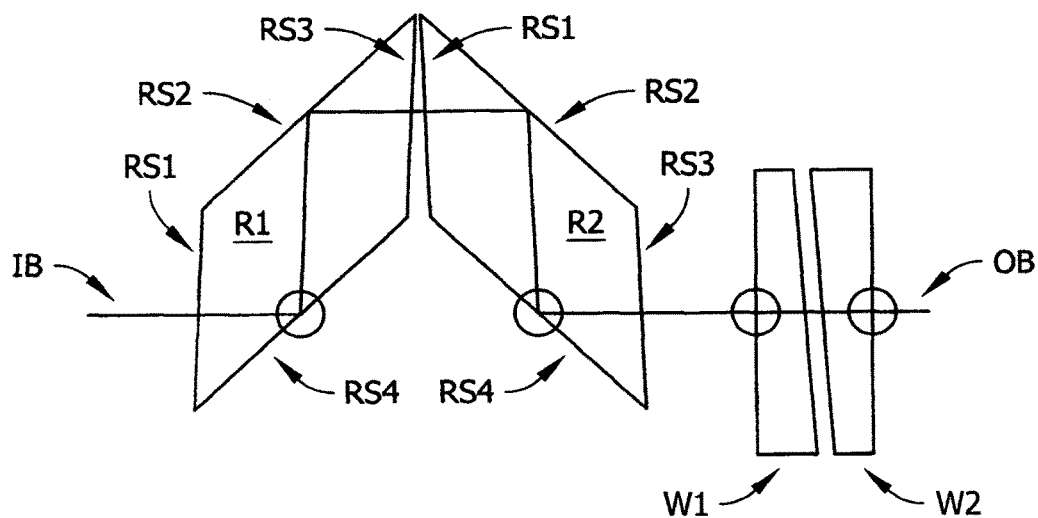
FIGS. 1 and 2 show prior art substantially achromatic retarders.
Figure 2:
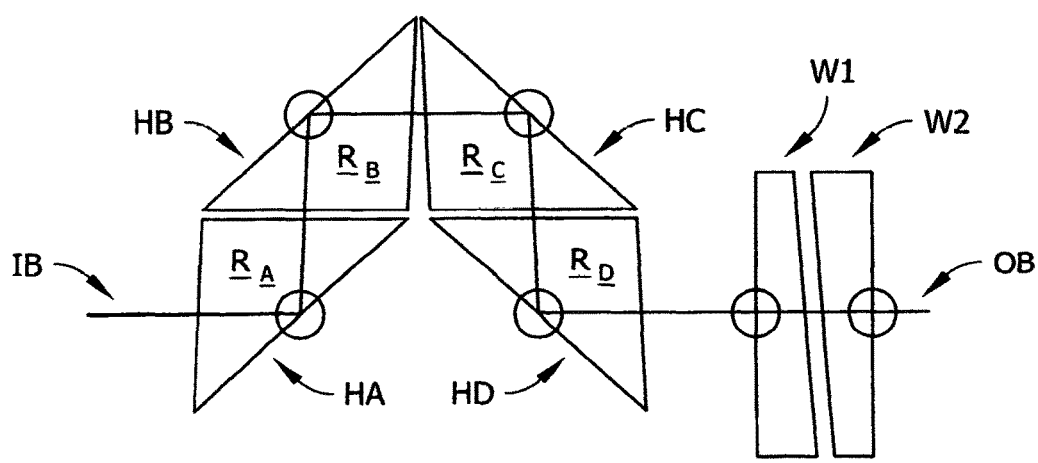

FIGS. 1 and 2 show prior art substantially achromatic retarders. FIG. 1 shows a prior art system for introducing a relative phase retardation into orthogonal polarized components of an electromagnetic beam entered thereinto comprises at least two sequential elements (R1) (R2) oriented with respect to one another such that said entered electromagnetic beam undergoes total internal reflection at least twice in each of the at least two elements, (see reflections at sides (RS4) and (RS2) in (R1) and at sides (RS2) and (RS4) in (R2)). Additionally present is a multiple wedge (W1) (W2) system for use in adjusting relative phase retardation between orthogonal components in a polarized electromagnetic beam, and wherein one said wedge (W1/W2) can be rotated with respect to another (W2/W1) thereof, and/or both wedges (W1) (W2) can be rotated simultaneously, for the purpose of aligning the system so that the output beam is substantially undeviated for said input beam. The sequence, orientation, geometry, and symmetry of the elements is such that the output beam (OB) position is substantially untranslated and undeviated from the input beam (IB) by a translation of the system, and the output beam (OB) angle is substantially untranslated and undeviated by a rotation of the system. FIG. 2 shows a system which comprises at least four sequential elements, ($R_A$) ($R_B$) ($R_C$) ($R_D$), and said beam undergoing total internal reflection once in each of the elements, (at side (HA) in ($R_A$), at side (HB) in ($R_B$), at side (HC) in ($R_C$) and at side (HD) in ($R_D$). Said system is characterized in that each of said at least four elements ($R_A$) ($R_B$) ($R_C$) ($R_D$) are right angle prisms having right angle sides adjacent to the right angle thereof and a side, ((HA) (HB) (HC) (HD)) respectively), opposite the right angle thereof, aid right angle prisms being oriented with respect to one another such that, as viewed in side elevation, the first right angle prism ($R_A$) is positioned so that it's side opposite the right angle thereof is facing downward and to the right, and so that directly above the first right angle prism ($R_A$) is present a second right angle prism ($R_B$), which is oriented so that its opposite the right angle thereof is facing upward and to the left, and so that directly to the right of the second right angle prism ($R_B$) is a third right angle prism ($R_C$), which is oriented so that it's side opposite the right angle thereof is facing upward and to the right, and so that directly below said third right angle prism ($R_C$) is positioned a fourth right angle prism ($R_D$), oriented so that it's side opposite the right angle thereof is facing downward and to the left. Note that the sides of the elements (R1) (R2) (HA) (HB) (HC) and (HD) from which a beam reflects in use, are typically coated with such as $MgF_2$ to enhance the achromatic characteristics.

Turning now to FIGS. 3 and 4, it is first noted that FIG. 3 shows a system which is substantially identical with that in FIG. 1, with the exception of the wedge elements (W1) (W2) being absent. While they could be present, it is the presence of Berek-type retarders (BR) at the input and output of the substantially achromatic retarder configuration of elements (R1) and (R2) that distinguish the present invention from that which preceded it in the prior art. In use said Berek-type retarders can be positioned via a rotation about a central axis, to eliminated all need for any coatings on the sides of (R1) and (R2) to effect total internal reflections that lead to a substantially achromatic response. FIG. 4 is substantially similar to FIG. 2, again but for the removal of the wedges (W1) and (w2). Again, these could be present, but it is the presence of Berek-type retarders (BR), at the input and output of the substantially achromatic retarder configuration of elements (R1) and (R2) that distinguish the present invention from that which preceded it in the prior art.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A system for introducing a relative phase retardation between orthogonal components of a polarized beam of electromagnetic radiation entered thereinto, said system consisting of at least two sequential elements oriented with respect to one another such that an entered beam of electromagnetic radiation undergoes total internal reflection at least twice in each of the at least two sequential elements; said at least two sequential elements having a sequence, orientation, geometry, and symmetry such that an output beam locus is substantially undeviated and untranslated with respect to an input beam locus, when the system undergoes a translation, or a rotation about said locus of said input beam of electromagnetic radiation, said output beam of electromagnetic radiation being continuous with the input beam of electromagnetic radiation;

said system being characterized by one selection from the group consisting of:
there is an external coating at at least one location at which total internal reflection occurs; and
there is no external coating at at least one location at which total internal reflection occurs; and said system further comprising first and second Berek-type retarders at the input thereto and at the output therefrom, respectively, so that in use a polarized beam of electromagnetic radiation passes through the first Berek-type retarder, undergoes two total internal reflections in the first sequential element, two total internal reflections in the second sequential element, and exits through said second Berek-type retarder.

2. A system as in claim 1, in which said system does not have any external surface coating at at least one location whereat total internal reflection occurs.

3. A system as in claim 1, which comprises at least four sequential elements, and said beam undergoing total internal reflection once in each of the elements, said system being characterized in that each of said at least four elements are right angle prisms having right angle sides adjacent to the right angle thereof and a side opposite the right angle thereof, said right angle prisms being oriented with respect to one another such that, as viewed in side elevation, the first right angle prism is positioned so that it's side opposite the right angle thereof is facing downward and to the right, and so that directly above the first right angle prism is present a second right angle prism, which is oriented so that its opposite the right angle thereof is facing upward and to the left, and so that directly to the right of the second right angle prism is a third right angle prism, which is oriented so that it's side opposite the right angle thereof is facing upward and to the right, and so that directly below said third right angle prism is positioned a fourth right angle prism, oriented so that it's side opposite the right angle thereof is facing downward and to the left;

said first two right angle prisms encountered by said beam forming, in functional combination, the first of said at least two sequential elements and wherein the reflections in said first two right angle prisms constitute the at least two reflections in said first of said at least two sequential elements, and the second two of said right angle prisms encountered by said beam forming, in functional combination, the second of said at least two sequential elements, and wherein the reflections in said second two right angle prisms constitute the at least two reflections in said second of said at least two sequential elements.

4. A system as in claim 3 in which the angle of the right angle prisms are 45, 90 and 45 degrees.

5. A system as in claim 3, in which the right angle prisms are fabricated form fused silica.

6. A system as in claim 1 which further comprises means for translating and/or tilting at least one of the sequential elements for the purpose of aligning the system such that the output beam is substantially undeviated from said input beam.

7. A system as in claim 1, in which there is additionally present a multiple wedge system for use in adjusting relative phase retardation between orthogonal components in a polarized electromagnetic beam, and wherein one said wedge can be rotated with respect to another thereof, and/or both wedges can be rotated simultaneously, for the purpose of aligning the system so that the output beam is substantially undeviated from a locus of said beam input thereinto.

8. A method of applying a system for introducing a relative phase retardation between orthogonal components of a polarized electromagnetic beam entered thereinto comprising;
    a) providing a system for introducing a relative phase retardation between orthogonal components of a polarized beam of electromagnetic radiation entered thereinto, said system consisting of at least two sequential elements oriented with respect to one another such that an entered beam of electromagnetic radiation undergoes total internal reflection at least twice in each of the at least two sequential elements; said at least two sequential elements having a sequence, orientation, geometry, and symmetry such that an output beam locus is substantially undeviated and untranslated with respect to an input beam locus, when the system undergoes a translation or a rotation about Hail said locus of said input beam of electromagnetic radiation, said output beam of electromagnetic radiation being continuous with the input beam of electromagnetic radiation;
    said system being characterized by one selection from the group consisting of:
        there is an external coating at at least one location at which total internal reflection occurs; and
        there is no external coating at at least one location at which total internal reflection occurs; and
    said system further comprising first and second Berek-type retarders at the input thereof thereto and at the output therefrom, respectively, so that in use a beam of electromagnetic radiation passes through the first Berek-type retarder, undergoes two total internal reflections in the first sequential element, two total internal reflections in the second sequential element, and then exits through said second Berek-type retarder;
    said method further comprising:
    b) causing a polarized input beam of electromagnetic radiation to enter the first Berek-type retarder, then pass through the first and second sequential elements, and pass through the second Berek-type retarder;
    c) effecting tilt of said first and second Berek-type retarders so that substantially achromatic retardation is entered between orthogonal components of said beam of polarized electromagnetic radiation over a selected wavelength range.

9. A method as in claim 8, in which the step involving provision of at least two sequential elements comprises providing that each thereof is comprised of two right angle prism elements, in functional combination.

10. A system for introducing a relative phase retardation between orthogonal components of a polarized beam of electromagnetic radiation, said system consisting of at least two sequential elements oriented with respect to one another such that a beam of electromagnetic radiation entered thereinto undergoes total internal reflection at least twice in each thereof;
    said system being characterized by one selection from the group consisting of:
        there is an external coating at at least one location at which total internal reflection occurs; and
        there is not an external coating at at least one location at which total internal reflection occurs; and
    said system being distinguished and characterized by the presence of first and second Berek-type retarders at the input thereto and at the output therefrom, respectively, so that in use a polarized input beam of electromagnetic radiation passes through the first Berek-type retarder, undergoes at least two total internal reflections in each of the sequential elements, and exits through said second Berek-type retarder as an output beam of electromagnetic radiation, said output beam of electromagnetic radiation being continuous with said input beam of electromagnetic radiation.

11. A system as in claim 10, wherein the locus of said output beam of electromagnetic radiation is not offset or deviated from the locus of said input beam of electromagnetic radiation.

12. A system as in claim 10, in which said system does not have any external surface coating at at least one location whereat total internal reflection occurs.

13. A system as in claim 10, which comprises at least four sequential elements, and said beam undergoing total internal reflection once in each of the elements, said system being characterized in that each of said at least four elements are right angle prisms having right angle sides adjacent to the right angle thereof and a side opposite the right angle thereof, said right angle prisms being oriented with respect to one another such that, as viewed in side elevation, the first right angle prism is positioned so that it's side opposite the right angle thereof is facing downward and to the right, and so that directly above the first right angle prism is present a second right angle prism, which is oriented so that its opposite the right angle thereof is facing upward and to the left, and so that directly to the right of the second right angle prism is a third right angle prism, which is oriented so that it's side opposite the right angle thereof is facing upward and to the right, and so that directly below said third right angle prism is positioned a fourth right angle prism, oriented so that it's side opposite the right angle thereof is facing downward and to the left;
    said first two right angle prisms encountered by said beam forming, in functional combination, the first of said at least two sequential elements and wherein the reflections in said first two right angle prisms constitute the at least two reflections in said first of said at least two sequential elements, and the second two of said right angle prisms encountered by said beam forming, in functional combination, the second of said at least two sequential elements, and wherein the reflections in said second two right angle prisms constitute the at least two reflections in said second of said at least two sequential elements.

14. A system as in claim 13 in which the angle of the right angle prisms are 45, 90 and 45 degrees.

15. A system as in claim 13, in which the right angle prisms are fabricated form fused silica.

16. A system as in claim 10 which further comprises means for translating and/or tilting at least one of the sequential elements for the purpose of aligning the system such that the output beam is substantially undeviated from said input beam.

17. A system as in claim 10, in which there is additionally present a multiple wedge system for use in adjusting relative phase retardation between orthogonal components in a polarized electromagnetic beam, and wherein one said wedge can be rotated with respect to another thereof, and/or both wedges can be rotated simultaneously, for the purpose of aligning the system so that the output beam is substantially undeviated from a locus of said beam input thereinto.

* * * * *